United States Patent [19]

Liffick

[11] 3,960,047

[45] June 1, 1976

[54] DUAL SIZE LUG NUT

[75] Inventor: Fenton A. Liffick, Granada Hills, Calif.

[73] Assignee: Cragar Industries, Inc., Compton, Calif.

[22] Filed: Sept. 9, 1974

[21] Appl. No.: 504,208

[52] U.S. Cl. .............................. 85/32 R; 301/9 DN; 301/111
[51] Int. Cl.² ......................................... F16B 27/00
[58] Field of Search ........... 85/32 R, 32 K; 301/5 R, 301/9 DN, 111, 114; 285/390; 151/15, 16; 403/43

[56] References Cited
UNITED STATES PATENTS

| | | | |
|---|---|---|---|
| 991,517 | 5/1911 | Kennedy | 85/32 K |
| 1,257,097 | 2/1918 | Morris | 403/43 |
| 1,360,421 | 11/1920 | Lloyd | 403/43 |
| 2,534,662 | 12/1950 | Froom | 85/32 R |
| 3,253,862 | 5/1966 | Wantanabe | 301/9 DN |

Primary Examiner—Robert B. Reeves
Assistant Examiner—D. W. Keen
Attorney, Agent, or Firm—Jessup & Beecher

[57] ABSTRACT

A dual size lug nut for securing an automobile wheel to a hub. From a central head portion of the nut, threaded shanks extend in opposite direction. The two shanks have different threads. Thus the nut may be screwed onto either of two sizes of stud bolts, depending on which end of the nut is threaded onto the bolt. In this way the inventory of parts may be reduced, in that a single type or style of nut will serve alternatively either of two sizes of stud bolts. A cap or plug covers the exposed outward facing bore.

5 Claims, 4 Drawing Figures

DUAL SIZE LUG NUT

DESCRIPTION OF THE PREFERRED EMBODIMENT

Figure 1:
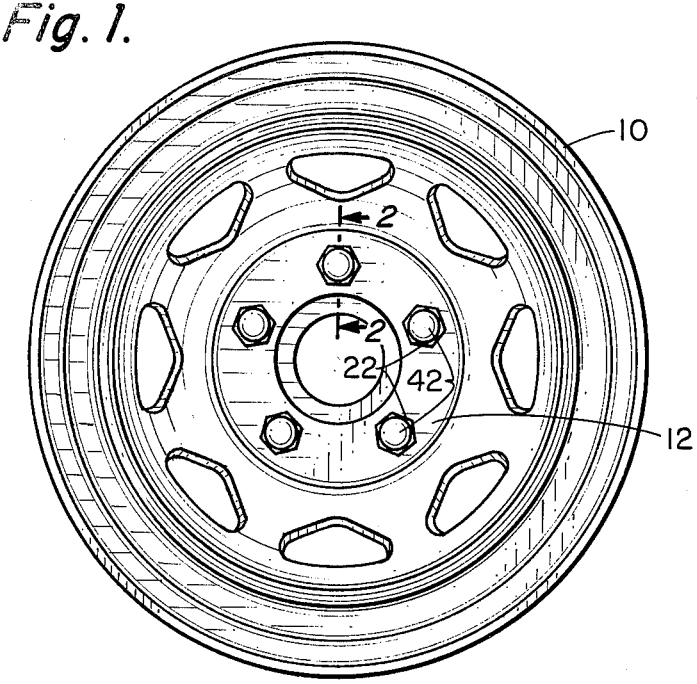
FIG. 1 is a side elevation of an automobile wheel showing nuts in accordance with this invention in position securing the wheel to an automobile hub.
Figure 3:
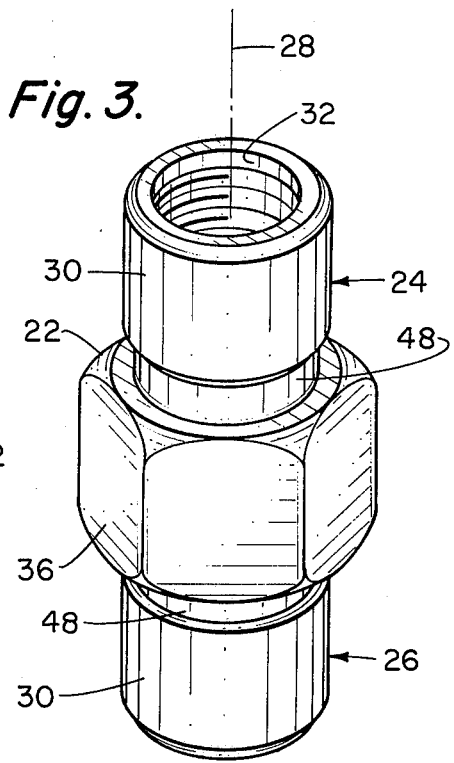
FIG. 3 is an exploded perspective view showing the nut per se.

In FIG. 1 there is shown an automobile wheel 10 having a central webbed portion 12 circumjacent the wheel axis. Spaced circumferentially around the web portion 12 are a plurality of bolt apertures or holes 14 (FIG. 2) through which extend stud bolts 16 fixedly secured to and extending from the hub 18 of the automobile. A five-bolt wheel is illustrated, but the invention is obviously applicable to any number of studs.

Onto each of the studs 16 is screwed a respective nut constructed in accordance with the present invention. Each nut comprises a body 20 having a central head portion 22 and a pair of shank or end portions 24 and 26 extending in opposite directions from the head portion 22 and coaxial with the axis 28 of the nut. Intermediate the nut head 22 and the wheel web 12 a bowed or frustospherical washer 29 is positioned with its convex face engaging the head 22. The bowed nature of washer 29 is depicted in FIG. 2, although it is to be understood that in use the nut 20 is screwed down tight, to flatten the washer.

The apertures 14 in the wheel web 12 may be circular or oblong.

The shank portions 24 and 26 are of substantially equal axial length from the intersection with the head portion 20 to the ends thereof; and they have a common external diameter, represented by the cylindrical surface 30, which is adapted to fit within the bolt hole 14 when the nut is threaded onto the stud 16.

Figure 2:
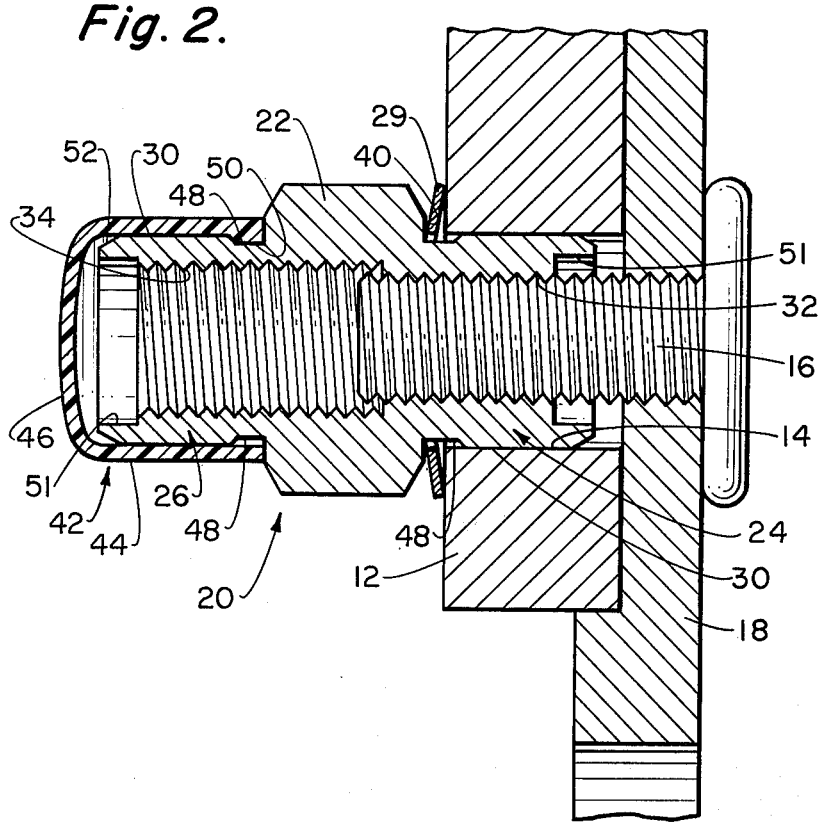
FIG. 2 is an enlarged fragmentary cross-section taken on line 2—2 in FIG. 1.

The aligned opposite shank portions 24 and 26 also have axially aligned bores of different thread, specifically of different diameter, as shown in FIG. 2. Any two sizes of bore or thread may be employed. For example, the shank portion 24 may have a 7/16ths inch threaded bore 32, twenty threads to the inch; and the shank portion 26, a ½ inch threaded bore 34, twenty threads to the inch.

The exterior periphery of the central head portion 22 extends radially beyond the external diameter surface 30 and is provided with six wrench-receiving flats 36, forming a hexagonal nut surface.

In use, the central head portion 22, through the washer 29, bears against the wheel web 12 at the annulus 40 circumjacent the bolt hole 14, and clamps the wheel 10 to the hub 18.

For cosmetic purposes the unused shank (26 in FIG. 2) may be covered by a cap 42 comprising a tubular body 44 having an internal diameter slightly greater than the external diameter 30 of the shank portions 24/26. The length of the tubular body 44 is slightly greater than the axial length of the shanks 24/26. One end of the tubular body 44 is closed by an integral dome 46. Means are provided for securing the cap 42 to and over the end of either of the shank portions 24 or 26. This means comprises a groove 48 formed at the base of each shank portion 24/26, where the shank joins the head 22. At the open end of the tubular body 44 is formed a short, narrow, integral chordal flat 50 adapted to snap into the groove 48 after the cap 42 has been pressed over the external shank 24 or 26.

The internal periphery of the tubular body 44, at the plane at which the flat 50 is located, is slightly greater than the circumference 30 of the shanks 24/26. The cap is made of a somewhat elastic material, such as plastic or aluminum, so that when pressed over the end of the shank 24/26, it stretches into a circular form and may be slid over the circumference 30. When the cap is fully in position, the flat 50 snaps into position in the groove 48 by virtue of the resiliency of the material.

While the design may permit subsequent removal of the cap if desired, it is intended in general that the cap will stay permanently in position once installed, since the function of the bolt has been by then determined, i.e., to fit over either a 7/16ths or a ½ inch stud 16. The press fitting of the cap 42 over the shank 24/26 is expedited by a chamfer 52 formed at the outer edge of each of the shanks.

In use of this invention the purchaser of a wheel 10 is provided with five nuts and five caps 42. He may then apply the wheel 10 to a five-stud hub having either 7/16ths inch or ½ inch studs 16. The cap 42 may be snapped in place either before or after the nuts have been screwed onto the studs 16.

Figure 4:
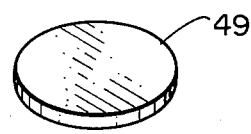
FIG. 4 is a perspective view of an alternate means for capping the outer end of the nut.

In lieu of the cap 42, the outward facing bore may be closed by a plug disk 49 (FIG. 4). For this purpose, each bore 32 and 34 is provided with a counterbore 51, dimensioned to snugly receive the disk 49 press fitted thereinto.

In this way the supplier need inventory substantially fewer nuts than would be otherwise required, since a single style of nut will accommodate alternatively either 7/16ths inch or ½ inch studs.

What is claimed is:

1. Dual size nut comprising:
   a body having a central head portion and axially aligned opposite end portions,
   said end portions having threaded, axial bores of different thread of the same direction
   said central head portion extending radially beyond the end portions, and having flats on the exterior thereof circumjacent the axis,
   whereby the nut may be threaded onto a bolt, screw, or stud of either of two threads to secure a wheel to a hub wherein said end portions have external round surfaces adapted to fit within a bolt hole of said wheel.

2. Plurality of nuts in accordance with claim 1, in combination with an automobile hub and wheel,
   said hub having extending, threaded studs,
   said wheel having holes mounted on said studs,
   said nuts being threaded onto said studs with the respective said central portions clamping said wheel to said hub.

3. Dual size lug nut for securing a wheel to a hub having either of two sizes of stud bolts comprising:
   a body having a central head portion and axially aligned opposite shank portions,
   said shank portions being of substantially equal axial lengths and having a common external diameter and threaded axial bores of different diameters, said shank portions being adapted to fit within a bolt hole of the wheel when the nut is threaded onto a stud bolt, the exterior periphery of said head portion extending radially beyond said external diameter and comprising a plurality of wrench-receiving flats, said head portion being adapted to clamp the wheel to the hub when either of said shanks is threaded onto a stud bolt.

4. Nut in accordance with claim 3 including:

a cap comprising, a tubular body having an internal diameter slightly greater than said external diameter and a length slightly greater than the axial length of said shanks, a dome closing one end of said body, and means for securing said cap to either of said shank portions.

5. Nut in accordance with claim 3 wherein:

each of said bores is counterbored to a given diameter, and including a circular plug adapted to be fitted snugly into either of the counterbores.

* * * * *